United States Patent [19]

Reischl et al.

[11] 4,297,456

[45] Oct. 27, 1981

[54] PROCESS FOR WORKING UP ISOCYANATE DISTILLATION RESIDUES

[75] Inventors: Artur Reischl; Kuno Wagner, both of Leverkusen, Fed. Rep. of Germany

[73] Assignee: Bayer Aktiengesellschaft, Leverkusen, Fed. Rep. of Germany

[21] Appl. No.: 169,589

[22] Filed: Jul. 17, 1980

Related U.S. Application Data

[63] Continuation-in-part of Ser. No. 88,800, Oct. 29, 1979, abandoned.

[30] Foreign Application Priority Data

Oct. 27, 1978 [DE] Fed. Rep. of Germany ....... 2846815

[51] Int. Cl.$^3$ ............................................. C08G 18/70
[52] U.S. Cl. .................................... 525/452; 203/38; 203/47; 203/57; 203/59; 203/61; 203/62; 203/63; 203/64; 203/99; 525/461; 525/540; 528/44; 528/502; 528/902
[58] Field of Search .................... 525/452, 461, 540; 528/44, 502, 902; 203/38, 47, 57, 59, 61, 62, 63, 64, 99

[56] References Cited

U.S. PATENT DOCUMENTS

| | | | |
|---|---|---|---|
| 3,180,852 | 4/1965 | Pfinschke et al. | 260/453 |
| 3,455,836 | 7/1969 | Shultz et al. | 521/160 |
| 3,634,361 | 1/1972 | Shultz et al. | 528/67 |
| 3,636,030 | 1/1972 | Perkins | 260/453 SP |
| 3,897,314 | 7/1975 | Liebsch et al. | 260/453 PH |
| 3,963,679 | 6/1976 | Ullrich et al. | 528/45 |
| 3,993,641 | 11/1976 | Tiemann et al. | 260/239 AR |
| 4,065,362 | 12/1977 | Kataoka et al. | 203/38 |
| 4,076,577 | 2/1978 | Hetzel et al. | 260/453 SP |
| 4,143,008 | 3/1979 | Zwolinski et al. | 260/453 SP |

*Primary Examiner*—Maurice J. Welsh
*Attorney, Agent, or Firm*—Gene Harsh; Joseph C. Gil; Lyndanne M. Whalen

[57] ABSTRACT

This invention relates to a process for working up the distillation residue obtained in the commercial production of tolylene diisocyanate by grinding, optionally accompanied and/or followed by chemical modification reactions. The finely divided powder obtained may be used as a reactive filler in the production of a variety of plastics.

13 Claims, No Drawings

PROCESS FOR WORKING UP ISOCYANATE DISTILLATION RESIDUES

This application is a continuation-in-part of copending application Ser. No. 88,800 filed Oct. 29, 1979 and now abandoned.

BACKGROUND OF THE INVENTION

Considerable quantities of relatively high molecular weight, crosslinked, secondary products are formed in the production of isocyanates on an industrial scale. These secondary products are obtained in the form of a tar-like, non-distillable residue during the working up, by distillation, of the crude isocyanate solutions obtained in the phosgenation of amines. These residues are generally unsuitable for the conventional applications of polyisocyanates (production of polyurethane plastics). In order to avoid a total loss of the non-distillable residue, it is possible in some cases (for example, in the phosgenation of diamines of the diphenylmethane series) to isolate only part of the pure monomeric isocyanate from the crude phosgenation product, i.e. to leave a considerable proportion of monomeric isocyanate in the sump phase, in order to keep the relatively high molecular weight secondary products in solution. For the liquid polyisocyanate mixture enriched with relatively high molecular weight products obtained in this way (so-called "crude MDI"), it has been possible in recent years to find a number of potential applications in special plastics.

All attempts, however, to use tolylene diisocyanate enriched with relatively high molecular weight secondary products (crude "TDI") and having a low, but still economically acceptable content of monomeric tolylene diisocyanate have so far failed. During distillation of the phosgenation product of tolylene diamines, relatively high molecular weight insoluble products containing uretdione, isocyanurate, carbodiimide, uretone imine, urea and biuret groups are formed under the conditions used in practice. Depending on the o-tolylene diamine content of the starting product, methyl benzimidazolones can also be formed during phosgenation and, with time, are biuretized with the free isocyanate groups present, accompanied by formation of insoluble, crosslinked products. Although crude TDI distillation residues which still have a high monomer content (above 80% by weight) and which contain virtually no methyl benzimidazolone or its derivatives, are soluble, they are not sufficiently stable in storage. The content of free NCO-groups decreases during storage, even at room temperature, accompanied by an increase in viscosity.

Numerous processes have also been proposed (U.S. Pat. No. 3,634,361, German Offenlegungsschrift No. 2,123,183, German Offenlegungsschrift No. 2,333,150, U.S. Pat. No. 3,455,836, and German Offenlegungsschrift No. 2,423,594) for dissolving TDI distillation residues, which still have a considerable content of free NCO-groups (preferably above 20% by weight), in an organic solvent in the presence of monomeric diisocyanates, optionally at high temperatures. These residue solutions may then be used as the isocyanate component for the polyisocyanate polyaddition process. In practice, however, this method of utilizing the TDI residues fails because of the inadequate stability during storage and the inability to standardize the solutions (if, in fact, solutions were obtained at all) or because of the sedimentation of insoluble constituents.

In recent years, TDI distillation residues have been partly utilized by means of alkaline hydrolysis. Unfortunately, only relatively small proportions of tolylene diamines can be recovered.

More success in maximizing the yield of 2,4-TDI ("T 100") or of isomer mixtures of 80% of 2,4-TDI and 20% of 2,6-TDI ("T 80") or 65% of 2,4-TDI and 35% of 2,6-TDI ("T 65"), based in each case on the tolylene diamine used, has been achieved by using the so-called long-tube vertical evaporators (U.S. Pat. No. 3,897,314) which have been adopted for use on a wide scale in the commercial production of tolylene diisocyanate, and by continuous thermolysis of the liquid TDI residue tar. In the above process, the residue is substantially free from monomers, but still contains free isocyanate groups. This residue has to be stirred into water (quenching) in the form of a hot (approximately 150° to 300° C.) tar-like mass immediately after separation of the pure monomeric TDI in order to avoid smoldering fires and for physiological reasons. During this quenching process, the majority of the free isocyanate groups still present react with the water to form additional polyurea groups (hereinafter called denaturing). This reaction is accompanied by the evolution of carbon dioxide. Only a very small percentage, generally around 1 to 10% by weight, of included isocyanate groups are left unreacted. Storage in water or in moist form causes the isocyanate content to undergo a further gradual reduction over a prolonged period.

These slag-like TDI residues contain polyurea and isocyanurate groups and are substantially insoluble in all the usual solvents. At temperatures above 250°±30° C. they begin to melt to some extent, decomposing and giving off gasses.

No commercially or economically interesting possibilities have been found for utilizing these TDI residue slags. This is particularly true for the extremely high-temperature-resistant infusible T 80-residue slag. It is mainly this T-80 residue slag which accumulates in the production of TDI.

The vast majority of TDI distillation residues accumulating world-wide in the production of TDI is either dumped or burned in furnaces, with considerable difficulty. These TDI residue slags amount to approximately 10% of the total TDI production. In cases where TDI residue slags are burned, deposits of firmly adhering, substantially incombustible tarry masses accumulate on the bottom of the combustion chamber, and, in many cases, decompose explosively at temperatures above about 500° C.

DESCRIPTION OF THE INVENTION

The object of the present invention is, therefore, to provide commercially feasible possibilities for recycling TDI distillation residue slags, particularly the TDI residue slags quenched and denatured in water.

It has now, surprisingly, been found that the TDI distillation residues may be converted into high quality reactive fillers by very fine grinding. Optionally, the grinding process can be accompanied by or followed by simple chemical modification reactions in the heterodisperse phase. These reactive fillers may be used in the production of a variety of different plastics by polyaddition, polycondensation or polymerization. The present invention relates to a process for working up tolylene diisocyanate distillation residues into useable starting products for the production of plastics. This invention comprises taking a substantially monomer-free, crosslinked, distillation residue, insoluble in inert organic solvents, and which cannot be melted without decomposing, of the type accumulating as slag in the removal of monomeric tolylene diisocyanates by distillation and by grinding it into a powder having a mean particle size of less than 800 m$\mu$, preferably less than 350 m$\mu$, more particularly less than 100 m$\mu$, and with particular preferance, less than 10 m$\mu$. The instant invention can also use TDI residues which have been water quenched and denatured. This invention also, optionally, comprises chemically modifying these residues at the same time as grinding and/or afterwards by reaction of the functional groups of the distillation residue, particularly the isocyanate groups with known compounds.

As explained above, the distillation residues used in the process according to the present invention are by-products in the production of 2,4- and/or 2,6-tolylene diisocyanate on an industrial scale. They are in the form of relatively high molecular weight residue slags crosslinked through main valency bonds. These by-products amount to about 10% by weight, based on the calculated quantitative yield of monomeric diisocyanates of the distillation process. To make them easier to handle, they are generally introduced into water heated beyond 150° C., with the formation of a coarse-grained, irregularly shaped, insoluble slag where a large number of the free isocyanate groups react with water to form polyurea groups. This slag still has a small content of free NCO-groups (generally less than 15% by weight and in most cases from 1 to 10% by weight). However, it is substantially free of monomeric diisocyanates. By "substantially free of monomeric diisocyanates" is meant a residue containing less than 7.5% by weight of monomeric diisocyanates. In many cases, the residue of the instant invention will have monomeric contents of less than 3.0% and in some instances lower than 1.5% by weight. In addition, the TDI residue slags also contain urea, biuret, uretdione, isocyanurate, carbodiimide, uretone imine and, in some cases, even methyl benzimidazolone groups and their biuretization products in varying quantitative ratios. These slags are so highly crosslinked through these functional groups that, even after size-reduction to a mean particle size of less than 5 m$\mu$, they are substantially insoluble in inert organic solvents. Methylene chloride, cyclohexane, cyclohexanone, toluene, xylene and dichlorobenzene are examples of these inert solvents. Boiling these slags in the above solvents has no dissolution effect either. Even in boiling dimethyl formamide, the residue powders are only partly swollen, but not dissolved. On heating, only a very small proportion, if any, of the TDI distillation residues soften at temperatures above about 250° C. Above about 280° C., the distillation residues decompose without melting, giving off gasses in the process.

The very coarse-grained TDI residue slag is preferably first precomminuted to less than 3 mm in a comminuting machine, for example in a cutting granulator or a hammer mill. It is then brought to the final particle size required using known wet or dry grinding processes. The present invention can be used in particular on TDI residue slags that have been quenched and denatured in water.

Where the TDI residues accumulate in water, as for example, in the above-described quenching process, any planned further modifying reactions can be carried out in an aqueous phase. It is particularly economical and environmentally sound to carry out final size-reduction by wet fine-grinding or superfine-grinding in batch-type or continuous machines arranged one behind the other in one or two stages. The solids concentrations during wet grinding are preferably between 15 and 45% by weight. In addition to tube and ball mills, it is particularly advantageous to use toothed colloid mills, trigonal gear ring mills, corundum disc mills and stirrer-equipped ball mills. A combination of a toothed colloid mill and a stirrer-equipped ball mill is suitable, for example, for particularly fine grain sizes.

In special cases, NH-addition reactions may even be carried out during the quenching process, for example, by directly stirring the viscous TDI residue melt into water to which NH-compounds have been added.

It is best, depending on the particle size, to use a deficit of NH-compounds in heavy, aqueous dilution and to stir the reaction mixture with intense turbulence to produce a more fine-grained TDI residue. This process can also be used during the grinding process.

In this way, for example, where denaturing is carried out in an aqueous ammonia solution or in ammonia-yielding solutions, such as an ammonium (bi)carbonate solution, a TDI residue slag is obtained which has an increased content of external urea groups, some of which are only monosubstituted. This slag is particularly readily accessible for subsequent condensation reactions.

Denaturing in the presence of ionomeric amines leads directly to TDI residues containing salt groups or groups capable of salt formation.

Size reduction in the aqueous phase may be controlled in such a way that, under the effect of the heat generated during grinding (which may optionally be regulated by cooling) and because of the formation of fresh cut surfaces accompanied by a considerable increase in the surface area, the TDI residue slag reacts with the water, even in the absence of externally applied heat. It is also possible, in cases where grinding is carried out in an aqueous medium, to effect other reactions by the addition of reactive compounds, for example, polyaddition reactions with NH-compounds or polycondensation reactions with carbonyl compounds. In special cases, it is possible during the grinding operation to replace some or all of the water by another liquid (optionally containing NCO-reactive groups) selected according to the particular application planned for the powdered residue.

The TDI residue slags obtained after wet grinding are used either in the form of very finely divided suspensions or pastes. Alternatively, after isolation of the suspending agent, they may be used as powders in the same way as the TDI residue powders obtainable by dry grinding.

TDI residue slags useable for dry grinding have been preground to less than 2–3 mm and predried, preferably at temperatures below 50° C. and have a moisture content of not much more than 10% by weight and preferably less than 5% by weight. The choice of the particular machines used for dry grinding is governed by the final particle size and particle size distribution required and the grinding costs. In comparison with plastics, the residue slags, being very hard by virtue of their high degree of crosslinking, may be ground without softening at temperatures of up to about 220°–300° C. This grinding can be done in conventional size-reducing machines free from any cooling problems. This is of particular importance in obtaining very fine particle sizes in the range of from less than 1 mμ to 5 mμ.

Grinding may be carried out, for example, in pinned-disc mills, ball mills or baffle plate mills. It may also be done in air-stream mills, such as cross-beater mills, gear ring mills or turbine mills. It is particularly advantageous to use steam-jet or air-jet mills because, in these mills, size reduction is primarily obtained by interparticle collisions, rather than by wall collisions. This results in very fine particle sizes in a single passage.

Dry grinding may also be carried out by singlestage and multistage, batch-type or continuous grinding processes. It is possible to produce commercial quantities of very fine TDI residue powders. These powders may contain free isocyanate groups or very fine-grained derivatives of TDI residue slag. The latter results by adding liquid, preferably low boiling reaction components effecting a modification reaction even in the gaseous phase during grinding.

Surprisingly size reduction of the TDI residue slag may also be carried out in conventional mixing devices equipped with ploughshare-like mixing elements and (preferably multistage) cutter heads. Apparatus of this kind are commercially available on both a laboratory and a technical scale. These mixers are both as a mill and a reactor for the modification reactions mentioned above.

It is only after wet or dry size reduction that the residual reactive groups in the residue slag are made available for a variety of different chemical reactions. Accordingly, before they are used as a reactive filler, the TDI residue powders obtained in accordance with the present invention may be subjected to a variety of different chemical modifications. These modification reactions may be carried out using a gas phase reactant and/or also in the presence of a liquid reaction medium.

In the above-mentioned modification reactions, it is primarily the small quantities of free isocyanate groups still present in the TDI residue powders which are reacted. Thus, it is possible, for example, to pass ammonia gas or gaseous amines through the finely ground TDI distillation residue, quickly reacting the free isocyanate groups in an exothermic reaction. The preferable method uses the counter-current principle and, therefore, needs no mechanical mixing. The reaction time can be as short as less than one minute. This gives rise to the formation in the TDI distillation residue of additional urea groups. These groups in turn can, particularly easily, enter into condensation reactions with carbonyl compounds, particularly formaldehyde. The carbonyl compounds can be passed through the powder at the same time as, or after, the reactions with ammonia or amines. Instead of using formaldehydeammonia mixtures, it is also possible to use urotropin under hydrolyzing conditions to form methylene-urea bridges. Suitable volatile amines are, for example, ethylamine, diethylamine, dimethylamine, butylamine, dibutylamine, ethylene diamine and propylene diamine. In addition to formaldehyde, suitable carbonyl compounds are, for example, acetaldehyde, propionaldehyde, butyraldehyde, acetone or methylethyl ketone.

Another modification reaction involving a gas phase reactant is the reaction with steam. The reaction of the free isocyanate groups in the finely powdered residue slag takes place slowly with steam at temperatures below 100° C. Quantitative polyurea formation may be quickly obtained, however, by applying reaction temperatures distinctly above the boiling point of water and preferably above 130° C. Providing adequately size-reduced TDI residue slag is used, it is sufficient to expose it to the above-mentioned temperatures wetted with water without any further mixing. Similarly, it is possible to use aqueous ammonia, aqueous amine solutions, or alcohols and carboxylic acids, optionally in gaseous form for modification reactions with the free NCO-groups. Examples of these are methanol, ethanol, propanol, isopropanol, butanol, ethylene glycol, diethylene glycol, propylene glycol, dipropylene glycol, formic acid and acetic acid.

Reactions particularly suitable for modifying the TDI residue powder in water or in an organic inert solvent are the catalyzed reactions of the free isocyanate groups with one another, for example, in the formation of uretdione groups in the presence of dimerization catalysts, such as trisubstituted phosphines, or the formation of carbodiimide groups in the presence of phospholine oxide. Another possible modification reaction is the addition reaction of the free isocyanate groups with weakly acid compounds (for example, bisulphite or other isocyanate donors) which may subsequently be split off, by applying elevated temperatures with the resulting liberation of the isocyanate groups. It is also possible to carry out a variety of different modification reactions in the liquid phase using compounds which contain groups reactive primarily with the isocyanate groups of the residue powder. Particularly preferred are hydroxyl, amino and/or carboxyl groups. Anionic and-/or cationic groups or groups capable of salt formation may also be introduced into the residue powder by modification reactions of this type. Most of these compounds not only react with the free NCO-groups of the residue, but also with its carbodiimide bonds. Suitable monohydric and polyhydric alcohols, amines and carboxylic acids which may optionally contain further functional groups (for example, ionic groups and/or groups capable of salt formation) are described, for example, in Canadian Pat. No. 1,081,385 and U.S. Pat. No. 4,147,680, as reactants for polyisocyanates in the in situ production of polyisocyanate polyaddition products in polyhydroxyl compounds. Amines suitable for modification reactions are also described in U.S. Pat. No. 4,192,927. Suitable carboxylic acids are described in U.S. Pat. No. 4,192,926 (in connection with the addition of these compounds with carbodiimide groups). It is also possible in accordance with U.S. Pat. No. 4,192,925, to add phosphites with the carbodiimide bonds of the TDI residue powder to form phosphonoformamidine groups. It is also possible to carry out the above-described modification reactions using carbonyl compounds in a liquid reaction medium. Suitable carbonyl compounds are described, for example, in U.S. Pat. No. 4,206,109.

In addition to water, suitable reaction mediums for the above-mentioned modification reactions are the known organic solvents which boil at temperatures preferably below 150° C. Particularly preferred are those that boil at temperatures below 130° C. These liquids, as mentioned above, are essentially non-solvents for the powdered TDI-distillation residue, i.e. merely act as suspending agents.

Examples of such organic solvents are methylene chloride, acetone, petroleum ether, cyclohexanone, ethylacetate, tetrahydrofuran, benzene, toluene and xylene. After the modification reaction, the liquid reaction medium may be removed by filtration and drying or by distillation. In many cases, it is sufficient to use only very small quantities of the liquid reaction medium (frequently less than 10% by weight, based on the residue powder) in order to dissolve the modifying agent or to disperse it uniformly in the TDI residue powder. In cases where it is required to use temperatures above the boiling point of the solvent, the above-mentioned modification reactions can be carried out in a pressure vessel.

In one particular variation of the process according to the present invention, copolymerizable unsaturated groups are introduced into the finely powdered TDI distillation residue. This may be done by any of the above-described modification reactions. An example of this variation of the process is reacting the residue powder with an unsaturated carbonyl compound (i.e. acrolein, crotonaldehyde or methyl vinyl ketone), an unsaturated hydroxyl compound (for example, allyl alcohol or hydroxyethyl acrylate or methacrylate) and/or unsaturated carboxylic acids (for example, acrylic acid, methacrylic acid, maleic acid or fumaric acid). Residue powders modified in this way are particularly suitable for use in radical polymerization reactions.

The very finely ground NCO-containing or NCO-free TDI residue slags may also be converted into hydrophilic aromatic polysulphonic acid derivatives, for example, in suspension in chlorinated hydrocarbons, by reaction with sulphur trioxide or chlorosulphonic acid, followed by hydrolysis. In the above reaction, some of the sulphonic acid groups enter into addition reactions with the carbodiimide groups present.

With amines, ammonia or alkali, the corresponding aryl sulphonic acid salts are formed. If compounds containing tertiary nitrogen have been introduced into the residue powder, the sulphonic acid TDI residue powders can form amphoteric systems where both the positive charge and also the negative charge are situated in the same molecule. Separately produced anionic and cationic TDI residue powders may be mixed in any ion-equivalent ratio and used, for example, as ion exchangers.

In special cases, when the reaction mixture passes a pasty transition state, the above-mentioned modifying reactions may advantageously be carried out in self-cleaning screw machines. Suitable extruders are described e.g. in "Schneckenmaschinen in der Verfahrenstechnik" by H. Hermann, Springer Verlag, Berlin/-Heidelberg/New York, 1972, and in U.S. Pat. Nos. 3,963,679 and 3,993,641, incorporated herein by reference.

It is known in the art that chemical reactions may be carried out in extruders. Generally, however, thermoplastic polymers are produced or worked up in such screw machines, temperatures above the softening point of the material being applied. Surprisingly, even the modification reactions according to the invention wherein non-meltable cross-linked TDI residue slags after denaturing with water are used may be carried out in the above-mentioned extruders, free-flowing, very finely divided powders being directly obtained at the head of the extruder.

The TDI residue powders may also be mixed at any time with powder-form polymeric hydrocyanic acids (so-called azulmic acids). Azulmic acids also contain reactive groups (particularly amino groups) which are capable of reacting both with the addable groups of the TDI residue (for example, NCO-groups and carbodiimide groups) and also with the modifying agents (for example, carbonyl compounds) optionally used in the working up of the residues. Processes for producing azulmic acids and for stabilizing them against the elimination of hydrocyanic acid are described, for example, in Houben-Weyl, Methoden der Organ. Chemie (1952), Volume 8, page 261, in Angew. Chem. 72 (1960), pages 379–384, in German Pat. Nos. 662,338 and 949,600 and in U.S. application Ser. Nos. 11,554 and 11,542, both filed Feb. 12, 1979.

The TDI distillation residues worked up in accordance with the present invention may be worked up into cellular or homogeneous sheets or molded bodies under pressure at elevated temperatures, optionally in a mold. They may also be used as a reactive filler in a variety of different plastics obtainable by polyaddition, polycondensation and/or polymerization reactions. They can be used in any quantity; generally in quantities of from 2 to 60% by weight, preferably in quantities of from 10 to 50% by weight, and, with particular preference, in quantities of from 15 to 40% by weight, based on the total quantity of modified plastic.

The TDI residue powders are preferably used as a filler in aminoplast and phenoplast resins. In this case, they are advantageously present during the production of these resins and are chemically incorporated into the polymer being formed through their numerous reactive groups. These resins are made using known methods, from carbonyl compounds and aminoplast or phenoplast monomers. Examples of these compounds are formaldehyde, urea, melamine and phenol. Carbonyl compounds and aminoplast and phenoplast monomers suitable for this purpose are described, for example, in U.S. Pat. Nos. 4,225,481; 4,206,109 and 4,160,754.

These TDI distillation residues may also be used as a reactive filler in the production of epoxide resins. The free isocyanate groups of the very finely divided TDI residue may react both with the hydroxyl groups always present in commercial epoxide resins and also, at elevated temperatures, preferably above 160° C., with the epoxide groups to form oxazolidone rings. In addition, hardeners containing amino or carboxyl groups may also react with the carbodiimide groups present in the TDI residue slag. These carbodiimide groups are present in up to about 17% by weight in the TDI residues.

Very fine TDI residue powders having a mean particle size of less than 50 m$\mu$, preferably less than 10 m$\mu$, are preferably mixed homogeneously into liquid diepoxides either at room temperature or at elevated temperatures. The hardener (for example, an amino compound, dicarboxylic acid or a dicarboxylic acid anhydride) is then reacted under process conditions known per se. In many cases, it is possible to partially react the polyfunctional TDI residue powders simultaneously with both the epoxide resin and with the hardener during polyaddition of the epoxide. The reactive filler is incorporated into the hardened cast resin through main valency bonds in this case.

The TDI residue powders added increase the hardness and reduce the flammability of the epoxide-based resins and, in addition, reduce their shrinkage. The TDI residue powders are added in amounts up to 50% by weight. In the case of large castings, hardening is accompanied by a smaller increase in the internal temperature than in the case of unfilled castings.

In special cases, the epoxide resins and the very finely powdered TDI residues may even be combined with phenol, melamine and/or formaldehyde (i.e. for the production of abrasives for grinding or polishing wheels).

These TDI residue slags may also be used as a reactive filler in the production of cyanate resins. See, for example, the starting compounds described in German Offenlegungsschrift No. 2,260,487.

TDI residue powders may also be advantageously used in the production of plastics, using a known method, by the polymerization or copolymerization of monomers containing olefinically unsaturated groups. The TDI residue powders containing copolymerizable groups can be used also. Examples of such monomers are acrylonitrile, styrene, butadiene, acrylic acid, methacrylic acid, vinyl chloride, vinylacetate and unsaturated polyesters.

The polymerization reactions are preferably carried out in a liquid medium, for example, in water or an organic solvent (in the presence of the finely divided TDI powder).

The very finely divided TDI residue powders, with or without free NCO-groups, may readily be coated by polymerization reactions. This coating may be done, for example, by copolymerizing monomeric or oligomeric vinyl compounds in the presence of the very finely powdered residue slag, optionally in a solvent which is inert to isocyanate groups. Depending on the melting range of the polymer coatings, indefinitely storable isocyanate residue powders of this type may be used, at any time, as a reactive filler at elevated temperatures to form main valency bonds. Optionally, further H-acid components may also be used. Depending on the quantity and compatibility of the polymer coatings with the TDI residue powders and the components optionally added, combinations such as these may be brought into the required form under pressure. The above process wherein blowing agents above the softening point of the polymer are used is also possible. Where linear polymers are used, forming or shaping may even be carried out using injection molding machines.

In cases such as these, the optionally modified finely divided TDI residue powders are used in quantities of from 5 to 80% by weight, preferably in quantities of from 20 to 60% by weight, based on the total weight of the mixture.

TDI residue powders having been modified by reaction with an excess of glycol as described above are stable in storage for any desired time and surprisingly may be manufactured like thermoplastic materials into molded bodies, preferably at a temperature of from 150° to 230° C., most preferably 170° to 200° C., and at a specific pressure of from 5 to 100 bar/cm$^2$, most preferably 10 to 40 bar/cm$^2$. The bulk weight of the residue powders modified by means of glycols generally is from 430 to 800 g/l (depending on the particle size), homogeneous molded bodies with a gross density of about 1.2 to 1.3 g/cm$^3$ being obtained or even products with a cellular structure and a density of about 0.7 to 1.2 g/cm$^3$.

Since TDI residue slags modified only by denaturing with water behave like duromers, it is believed that the glycol-modified residue powders under the pressing conditions partly are linearized. Scrap material from the moldings may be processed repeatedly under the conditions given above although their softening point under normal pressure is well above 270° C. As a consequence, the moldings may be demolded without any cooling.

If an extremely finely ground TDI residue modified with an excess of glycol is used, metal surfaces may be coated by a melt sintering process in a fluid bed reactor, preferably at temperatures above 250° C. These coatings are flameproof.

The TDI distillation residues worked up using the present invention are also important as reactive fillers and binding agents in the production of boards or moldings in high-temperature pressures by bonding lignocellulose-containing fibers, chips or layers. Additional binders used are preferably the condensation products of formaldehyde with urea, melamine or phenol known per se for this purpose, particularly in the form of their aqueous solutions or dispersions. It is already known from German Offenlegungsschrift No. 1,669,759 and from German Auslegeschrift No. 1,653,169 that, in addition to or instead of binders such as these, it is also possible to use polyisocyanates in the production of pressed materials based on vegetable starting materials containing ligno-cellulose.

It has now been found that the modified TDI residue slags of the present invention are highly suitable as binding agents or additional binding agents. In this connection they are used in quantities of at least 2% by weight, generally of from 2 to 90% by weight and preferably from 5 to 60% by weight, based on the total weight of the molding.

Suitable starting materials containing ligno-cellulose which may be bound in this way are, for example, wood, bark, cork, bagasse, straw, flax, bamboo, alfa grass, peanut and rice husks, sisal and coconut fibers. The material may be in the form of granulates, chips, fibers or powder. It may have a water content of from 0 to 35% by weight, preferably from 5 to 25% by weight. Optionally, from 1 to 50% by weight, preferably from 5 to 20% by weight of formaldehyde or a formaldehyde resin (expressed as solids, based on the total weight of the molding) and the above-mentioned quantity of TDI residue powder are added to it. This is followed by processing (generally under the effect of heat and pressure) to form boards or moldings.

Laminating boards or moldings may also be produced in the same way from veneers, papers or fabrics. Additionally, laminated boards or moldings may also be produced in this way from veneers and strip-form, bar-form or rod-form center layers (so-called cabinet making boards). This is done by treating these veneers with the TDI residue powder and the conventional binder and subsequently pressing them with the center layers, generally at elevated temperature and pressure. It is preferred to apply temperatures in the range of from 100° to 250° C., and, with particular preference, in the range of from 130° to 200° C. The initial pressure applied is preferably between 5 and 150 bars. The pressure subsequently falls, generally towards zero, in the course of the pressing operation. It is, of course, also possible to use organic or inorganic fungicides, insecticides, or flameproofing agents known per se. These additives are usually in quantities of from about 0.05 to 30% by weight, preferably in quantities of from 0.5 to 20% by weight.

Therefore, the present invention also relates to a process for the production of boards or moldings by the hot pressing of starting materials containing ligno-cellulose with a binder comprising at least 2% by weight, based on the total weight of the molding, of the modified TDI residue slags and optionally with formaldehyde resins as an additional binder.

The residue slags of the present invention may also be added as a reactive filler in lacquers and coatings of various kinds. These fillers are generally in quantities of from about 2 to 70% by weight, preferably in quantities of from about 5 to 40% by weight, based on the total solids content. Examples of lacquers and coatings such as these are roof or floor coverings, gap-filling and trowelling compounds known per se. Optionally, bitumen or tar compositions may also be added. Another potential application is in the modification of thermoplastic plastics. Here, the residue powders are mixed with the thermoplast in a quantity of from 3 to 200% by weight, preferably of from 10 to 100% by weight, based on the thermoplast, using techniques known per se (for example, co-extrusion). In this way, it is possible, for example, to considerably increase the hardness of flexible thermoplasts, such as flexible PVC. It is also possible, however, to add the residue powders to plasticized rigid polymers, such as rigid PVC. By adding the residue powders to plasticized rigid polymers, the amount of expensive rigid polymer needed can be reduced.

The TDI residue powders which preferably have been modified chemically may also be mixed with scrap plastics (preferably polyurethane foam material) and molded under pressure at above 100° C., preferably above 160° C., optionally in the presence of additional binding agents. Depending on thermoplastic properties of the plastic scrap and the pressing conditions, homogeneous or cellular products with excellent mechanical properties are obtained.

Materials of this type may be used, for example, in the production of structural components or furniture.

In all the above-mentioned applications, the TDI residue powders of the present invention may also be used with powder-form azulmic acids. The azulmic acids may be used in a quantitative ratio range of from 90:10 to 10:90.

The TDI residue powders may also be used in combination with other organic and/or inorganic fillers such as chalk, clay, calcium sulphate, silica, sand, charcoal and powdered plastic scrap.

The present invention is illustrated by, but is in no way limited to, the following Examples wherein the quantities quoted represent parts by weight or percent by weight, unless otherwise indicated.

EXPERIMENTAL PART

TABLE 1

Characterization of the TDI residues used in the Examples which accumulate as distillation residues, insoluble in inert solvents, in the production of monomeric tolylene diisocyanates.

| | Nature of the TDI- | NCO-content % | Type of size-reducing machines used | | Beginning of decomp. °C. | Particle size mµ |
|---|---|---|---|---|---|---|
| 1 | 2 | 3 | 4 | 5 | 6 | 7 |
| I | 80 D | 7.2 | — | HM + KZM | 280 | 130 |
| II | 80 D | 4.7 | HM | | 295 | 400 |
| III | 80 D | 8.4 | HM + LSM | | 275 | 20 |
| IV | 80 D | 9.9 | HM + LSM | | 270 | 4 |
| V | 80 | 13.9 | SG + TM | | 265 | 150 |
| VI | 65 D | 6.8 | — | HM + IZM | 270 | 85 |

TABLE 1-continued

Characterization of the TDI residues used in the Examples which accumulate as distillation residues, insoluble in inert solvents, in the production of monomeric tolylene diisocyanates.

| | Nature of the TDI- | NCO-content % | Type of size-reducing machines used | | Beginning of decomp. °C. | Particle size mµ |
|---|---|---|---|---|---|---|
| 1 | 2 | 3 | 4 | 5 | 6 | 7 |
| VII | 65 D | 11.6 | HM + TM | | 255 | 110 |

Key to Table 1
Column 1: Serial No. (in Roman numerals) of the TDI-distillation residue used in the Examples
Column 2: Nature of the TDI residue 80 or 65 = isomer ratio of the monomeric diisocyanate mixtures isolated from the crude product by distillation (2,4-TDI, 2,6-TDI = 80:20 or 65:35). D = quenching after isolation of the monomeric TDI by introducing the hot (150-200° C.), tar-like extremely viscous TDI pan residue into water-filled stirrer-equipped vessels with formation of a very coarse-grained TDI residue slag, evolution of $CO_2$ and polyurea formation (see below).
Column 3: NCO-component in % by weight, based on TDI residue (solids). The NCO-content is determined immediately after size-reduction at 50° C. in acetone using a sample additionally ground to less than 60 mµ.
Column 4: Type of rough and fine grinding machines used in dry grinding: HM = hammer mill LSM = air-jet mill SG = cutting granulator TM = turbine mill
Column 5: Type of rough and fine grinding machines used in wet grinding: HM = hammer mill KZM = colliod toothed ring mill TZM = trigonal toothed ring mill
Column 6: Beginning of decomposition in °C.
Column 7: Particle size in mµ of approximately 50% by weight of the ground material.

Note on TDI residue V

Isolation of the TDI pan residue in pure form (i.e. without quenching) is only possible providing special precautionary measures are taken, i.e. providing the hot melt (150°-200° C.) is immediately subjected to intensive cooling in the absence of oxygen to prevent exothermic self-ignition. The hard tar-like mass is infusible, even in powder form.

Quenching of tolylene diamine phosgenation residues TDI residues I-IV, VI and VII (Table 1)

The phosgenation residue remaining in the sump during the production of tolylene diisocyanates, i.e. approximately 10% by weight of the theoretical monomer yield, is run off in a hot (approximately 150° to 180° C.), highly viscous form into a stirrer-equipped vessel containing at least twice the quantity of water. A large number of the free isocyanate groups react to form polyurea groups. The reaction is accompanied by the evolution of carbon dioxide. This quenching and denaturing process is accompanied by intense heating of the water. This results in the formation of a coarse-grained, very irregularly shaped, porous residue slag. The water is run off into a trough until the water content still present in the slag has fallen to below 10% by weight, and more advantageously, for subsequent size reduction in a hammer mill, to below 5% by weight.

In order to determine the included isocyanate content, a sample has to be size-reduced to less than 60 mµ and heated in acetone to 50° C. By way of comparison, only about half the free NCO-groups are observed at room temperature. In the case of coarse-grained TDI residue slag, it is only possible to determine a fraction of the NCO-groups. Depending on the particle size, the NCO-content of the quenched and denatured residue slag wetted with water gradually decreases over a period of days (<500 mµ) to weeks (>2-3 mm) at room temperature. The reduction in the content of free isocyanate groups is prevented by drying the quenched and denatured TDI residue slag. This is done by pregrinding to a grain size of less than 3 mm, then drying in a recirculating air cabinet at temperatures below 50° C. until the water content has fallen to below 0.2%, followed by storage in the absence of air.

EXAMPLES

EXAMPLES 1 TO 4

Gas-phase polyaddition reactions

EXAMPLE 1

The TDI residue I is size-reduced in water to 200 mμ undersize (30%), then dewatered in a suction filter. It is spread out on enamel plates in approximately 2 cm thick layers and dried for about 3 hours at 130°–145° C. in a recirculation cabinet, or until the 7.2% by weight of free isocyanate groups still present before the heat treatment have quantitatively reacted, primarily with the steam, to form additional polyurea groups.

The dry, free-flowing powder has an apparent density of 560 g/l. Above 310° C., the powder gradually decomposes without melting, becoming dark brown in color.

EXAMPLES 2 AND 3

The dry-ground TDI residue II (Example 2) and VI (Example 3), characterized in Table 1, are treated with gaseous ammonia in a vessel equipped with a paddle stirrer. The ammonia is introduced from below. Depending on the NCO-content and particle size, a temperature of from 40° to 60° C. is reached in an exothermic reaction. The free isocyanate content falls towards zero after addition of a substantially equivalent quantity of ammonia.

The extremely light-colored, infusible addition products, modified by free terminal urea groups, may be used as high-temperature-resistant reaction components for condensation reactions with carbonyl compounds, particularly formaldehyde, optionally using urea(s) or phenol(s). The powder densities are 650 g/l (Example 2) and 510 g/l (Example 3).

Gas-phase masked-isocyanate addition reactions

EXAMPLE 4

A mixture of 100.0 parts by weight of dry-ground TDI residue IV (particle size <10 mμ) and 28.6 parts by weight of ε-caprolactam is heated to 120°–140° C. for about 90 minutes, or until the NCO-content has fallen to zero.

The light-colored, finely divided powder has a powder density of 365 g/l.

EXAMPLES 5 AND 6

Polyaddition reactions using small additions of inert solvents.

EXAMPLE 5

100 parts by weight of TDI residue III and a solution of 10 parts by weight of acetone and 12 parts by weight of ethanolamine are thoroughly mixed. The resulting mixture is kept at 55° C. for 1 hour in a reaction vessel, after which the acetone is evaporated off. A very finely powdered, NCO-free TDI residue modified by terminal hydroxy ethyl urea groups is quantitatively formed.

EXAMPLE 6

100 parts by weight of TDI residue III are mixed with 6 parts by weight of urea in 12 parts by weight of ethylacetate. The resulting mixture is heated to 140° C. in a pressure vessel. After 60 minutes, the solvent is distilled off and the biuretized TDI residue is isolated.

EXAMPLES 7–12

Polyaddition reactions in relatively large quantities of inert solvents in which the TDI residue is suspended.

EXAMPLE 7

100 parts by weight of TDI residue IV, 165 parts by weight of acetone and 11.9 parts by weight of N-methyl diethanolamine are boiled under reflux in a stirrer-equipped vessel until no more free isocyanate groups can be detected.

The TDI residue modified by incorporated tertiary nitrogen groups is isolated from the organic suspending agent in the form of a finely divided powder by filtration under suction and drying.

EXAMPLE 7a

The polyaddition reaction according to Example 7 is immediately followed by methylation with a 5 equivalent percent deficit of dimethyl sulphate in acetone suspension at boiling temperature. The extremely finely divided TDI residue containing quaternary nitrogen groups is isolated in the same way as described above. It is a water-insoluble cationic polyelectrolyte which, in contrast to the extremely hydrophobic starting product, can easily be suspended in water without the formation of a supernatant phase.

VARIATIONS OF EXAMPLE 7a

Instead of dimethyl sulphate, 1,2-dichloropropane, 1,4-dichlorobutene, a mineral acid or phosphoric acid may be used for quaternization. In these cases, the degree of quaternization is not quite as high.

EXAMPLE 8

In the same manner as in Example 7, 100 parts by weight of TDI residue IV having a particle size of less than 10 mμ, 150 parts by weight of toluene and 11 parts by weight of allyl alcohol are heated with stirring at the boiling temperature of the suspending agent until the unsaturated alcohol has been added to the free isocyanate groups, about 3 to 4 hours.

After the NCO-free suspension has been cooled, the modified, very finely divided TDI residue may be filtered under suction and dried (cf. Example 16). It may also be subjected without isolation to copolymerization in another reaction step.

EXAMPLE 9

100 parts by weight of TDI residue IV having a particle size of less than 10 mμ are suspended in 158 parts by weight of acetone, followed by the slow addition, at approximately 50° C., of 22 parts by weight of a diamine sulphonate corresponding to the following formula:

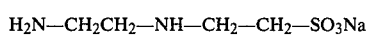

$$H_2N-CH_2CH_2-NH-CH_2-CH_2-SO_3Na$$

dissolved in 28 parts by weight of water.

The reaction mixture is then boiled under reflux for about 1 hour until no more free NCO-groups can be detected.

This anionic TDI modified residue sulphonate is suitable for use as a dispersion aid in the production of aqueous polyurethane dispersions.

EXAMPLE 10

100 parts by weight of TDI residue IV (particle size less than 10 m$\mu$) and 100 parts by weight (particle size <10 m$\mu$, obtained from hydrocyanic acid by Th. Volker's method, Ang. Chem. 72 (1960)) are suspended in 300 parts by weight of acetone and boiled for about 3 hours until the isocyanate groups have completely reacted with the amino groups of the polymeric hydrocyanic acid.

The isolated, NCO-free, very finely powdered polyadduct has an organic nitrogen content of 32% by weight.

EXAMPLE 11

100 parts by weight of TDI residue VII, 200 parts by weight of toluene and 90 parts by weight of a diepoxide corresponding to the following formula:

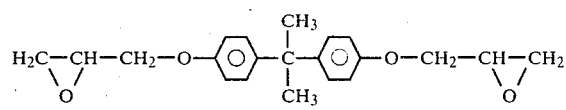

are kept for approximately 2.5 hours at approximately 110° C. in a stirrer-equipped vessel until the isocyanate groups have quantitatively reacted. After cooling, the finely powdered polyaddition product is isolated by filtration and drying under reduced pressure.

EXAMPLE 12 (use as filler)

100 parts by weight of TDI residue VII and 150 parts by weight of the diepoxide according to Example 11 diluted with 50 parts by weight of acetone are thoroughly mixed at room temperature. The diluent is distilled off in vacuo at a temperature below 50° C.

The residual mixture is heated for 15 minutes at about 150° C./20 bars in a steel mold. The molding, containing oxazolidone rings, is removed from the mold after cooling.

Masked-isocyanate addition reactions in acetone suspension

EXAMPLE 13

25 parts by weight of sodium bisulphite dissolved in 37 parts by weight of water are added to 100 parts by weight of TDI residue IV (particle size less than 10 m$\mu$) suspended in 150 parts by weight of acetone in a stirrer-equipped vessel. This mixture is heated to boiling temperature over a period of about 3 hours.

After the suspending agent has been removed, a modified, indefinitely storable TDI residue is obtained from the NCO-free suspension. The bisulphite may be removed from the TDI residue at temperatures above 120° C. with the recovery of free isocyanate groups.

EXAMPLES 14 AND 15

Catalytically initiated reactions of TDI residues

EXAMPLE 14

100 parts by weight of TDI residue V (R 80) having a particle size of less than 300 m$\mu$ are suspended in 150 parts by weight of anhydrous toluene, followed by the addition of 1 part by weight of phospholine oxide.

The free NCO-group content falls to zero over a period of from about 3 to 4 hours at reflux temperature with the elimination of $CO_2$.

The isolated, finely divided TDI residue has a carbodiimide group content of approximately 20% by weight.

EXAMPLE 15

The procedure is as described in Example 14, except that the phospholine oxide is replaced by a total of 3 parts by weight of tributyl phosphine added in 3 portions at intervals of 1 hour.

The TDI residue modified by uretdione groups liberates isocyanate groups at temperatures above 180° C. In the presence of amino groups, the isocyanate groups are liberated even at temperatures above 100° C.

EXAMPLES 16 AND 17

Polymerization reactions with TDI residues.

EXAMPLE 16

A total of 4 parts by weight of azodiisobutyrodinitrile and 45 parts by weight of monomeric acrylonitrile are alternately added in portions at from 60° to 90° C. to the NCO-free suspension of the TDI residue containing terminal allyl urethane groups obtained in accordance with Example 8. As the polymerization reaction progresses, the temperature is gradually increased to approximately 110° C. After cooling, the monomer-free suspension is filtered under suction, and the filter cake is washed with a little acetone and dried.

The extremely light-colored, finely divided reaction product has a powder density of 450 g/l. It is particularly suitable for use as a readily homogenizable organic filler.

EXAMPLE 17

100 parts by weight of TDI residue IV (particle size less than 10 m$\mu$) are suspended in 370 parts by weight of toluene. This is followed by the addition of 40 parts by weight, of an unsaturated polyester containing 1.4% by weight of terminal hydroxyl groups (acid number 1.4) of adipic acid, fumaric acid and 1,4-butane diol (molar ratio 13:13:29), 79 parts by weight of acrylonitrile, 30 parts by weight of styrene and a total of 3 parts by weight of azodiisobutylrodinitrile.

The hydroxyl groups of the polyester are initially polyadded with the free isocyanate groups of the TDI residue at 110° C., followed by polymerization in accordance with Example 16 as soon as no more free NCO-groups can be detected. The solvent-free, finely divided reaction product may be stirred at any time into polyethers or polyesters containing hydroxyl groups without any sedimentation and may be used as an active organic filler.

EXAMPLES 18 AND 19

Isocyanate addition reactions during wet grinding.

EXAMPLE 18

Immediately after preliminary grinding in a hammer mill (mean particle size approximately 0.8 mm; NCO-content 13.4% by weight), a TDI residue slag (65 D) is suspended in water at room temperature to form a 30% suspension. This is followed by the addition of 15 parts by weight of a 25% aqueous ammonia solution per 100 parts by weight of TDI residue solids.

The TDI residue is wet-ground in a trigonal toothed ring mill to a particle size of less than 160 m$\mu$ in this dilute, ammoniacal-aqueous phase, the temperature rising during grinding to around 70° C.

After at least 3 hours or more, the aqueous suspension is dewatered in a pressure filter and the filter cake (approximately 65% fine-grained) is washed and isolated.

The T 65 residue containing free terminal urea groups has an NCO-content of less than 0.2% by weight. It is particularly suitable for condensation reactions with carbonyl compounds or for mixed condensation reactions with carbonyl compounds and aminoplast or phenoplast formers.

EXAMPLE 19

100 parts by weight of the preground TDI slag (mean particle size 800 mμ) of Example 18 is suspended in water with 20 parts by weight of a 30% aqueous ethylene diamine solution to form a suspension having a solids content of approximately 30% by weight. As described in Example 18, this suspension is continuously pumped through a trigonal toothed ring mill. The NCO-free TDI residue containing additional polyurea groups is freed from the water by filtration under suction and drying at 100° C. in a recirculating air cabinet.

The powder density is 535 g/l.

EXAMPLE 20

100 parts by weight of the TDI slag corresponding to residue I are suspended in water with 10 parts by weight of a 25% aqueous ammonia solution to form a suspension having a solids content of 35%. As in Example 19, the suspension thus formed is ground in a colloid toothed ring mill to a grain size of less than 160 mμ. This is followed by condensation in a stirrer-equipped vessel for 3 hours at from 60° to 80° C./pH 3 with 12% by weight of formalin solution (containing 30% CH$_2$O) in the presence of phosphoric acid.

After cooling the condensation product is filtered under suction and washed once with 0.5% of ammonia water and twice with ion-free water, followed in each case by pressing.

The NCO-free TDI residue modified by polymethylene urea groups may be used for stabilizing plastics against heat.

EXAMPLE 21 to 26

Size reduction and reactions in a mixer reactor.

General Procedure

In a horizontally arranged cylindrical container comprising ploughshare-like mixing elements with a multistage cutter head, the TDI-residue preground to less than 33 mm is three-dimensionally brought into a state of intensive movement in a weak stream of nitrogen and heated to 90°–100° C. Further size reduction is obtained both by means of the cutter head, which rotates at high speed, and by intercollision of the very hard residue particles or by impact on the wall of the drum. During this fine size-reduction the glycols used are sprayed in under pressure in the quantities indicated in the Table in such a way that they are atomised into the fluidised material at an acute angle to the cutters. At a reaction temperature of around 100° C., the greater part of residual isocyanate content which may still be present in the TDI-residue powder reacts in 30 minutes to 2 hours, depending on the particle size, a corresponding equivalent quantity of the glycol used reacting to form urethane groups and, optionally, polyurethane compounds containing terminal hydroxyl groups. Under the described conditions, excess glycol is distributed uniformly in very thin layers over a very large area of the surface of the TDI-residue powder. If, in cases where TDI-residues denatured with water are used, a very small amount of residual moisture is still present, the highly hydrophilic glycols may partially penetrate into the often finely porous particles. In this way, it is possible to obtain free-flowing, very finely divided and non-dusting powders which, in the case of very fine particles, absorb up to 25 or even 35% by weight of glycols which are liquid at room temperature and, inspite of this, have a dry appearance.

Formulations and Pressing Conditions for Examples 21–25

TABLE 2

| Example No. | 21 | 22 | 23 | 24 | 25 |
|---|---|---|---|---|---|
| TDI-residue (parts) | 85 II | 88 II | 83 III | 80 VII | 85 VII |
| DG (parts) | 10 | — | 17 | 20 | 10 |
| EG (parts) | 5 | — | — | — | — |
| EGR (parts) | — | 12 | — | — | — |
| PPG (parts) | — | — | — | — | 5 |
| Pressing conditions | | | | | |
| °C. | 220 | 185 | 180 | 170 | 170 |
| Kp/m$^2$ | 40 | 50 | 50 | 30 | 10 |
| min./mm. | 0.3 | 0.5 | 0.3 | 0.2 | 0.2 |

DG = diethylene glycol
EG = ethylene glycol
EGR = EG-residue (sump residue of mono- to penta-ethylene glycol
PPG = polypropylene glycol (molecular weight 600)

Formulation for Example 26

A coarse-grained sample from the rough size-reduction of TDI-residue II having a coarse-grain fraction of 45% in the particle size from 0.5 to 3 mm is reacted with diethylene glycol in a ratio by weight of 90:10 in the mixing and size-reducing reactor and, after cooling, is further size-reduced for 1 to 2 hours in the mixer or ground to a particle size of less than 0.5–1 mm in an air stream mill.

In the case of the glycol-modified TDI-residues of Examples 21 to 25, subsequent size reduction is not necessary because the finely divided TDI-residues are not agglomerated under the test conditions applied.

Processing into Pressed Sheets

The TDI-residue powders modified with low molecular weight glycols obtained in accordance with Examples 21 to 26 may be pressed under a specific pressure of from 10 to 50 bars and at temperatures of from 170° to 220° C. to form sheets which have ball indentation hardness of from 9 to 16 kp/mm$^2$ and high impact strength. The fire-retarding effect is particularly remarkable. 2 to 5 mm thick sheets may be heated to red heat with an oxygen blast flame which produces surface foaming with an increase in volume. Following removal of the flame, the sheets are immediately self-extinguished.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for working up tolylene diisocyanate distillation residues into useable starting products for the production of plastics, wherein such distillation residue is a substantially monomer-free, crosslinked distillation residue which is insoluble in inert organic solvents and which cannot be melted without decomposing, of the type accumulating as slag in the removal of monomeric tolylene diisocyanates by distillation from the crude phosgenation product of tolylene diamines, comprising grinding said distillation residues to a mean particle size of less than 800 m$\mu$.

2. A process as claimed in claim 1, wherein the residue is first quenched and denatured by stirring into water.

3. A process as claimed in claim 1, wherein the residue is chemically modified at the same time and/or afterwards by reaction with compounds reactive to the functional groups of the distillation residue.

4. A process as claimed in claim 1, wherein the residue is ground to a mean particle size of less than 100 m$\mu$.

5. A process as claimed in claim 1, wherein the residue is ground to a mean particle size of less than 10 m$\mu$.

6. A process as claimed in claim 1, wherein the residue is wet-ground.

7. A process as claimed in claim 1, wherein the residue is modified during and/or after grinding by reaction with water and/or ammonia and/or amine functional compounds in the gas phase or in the liquid phase.

8. A process as claimed in claim 1, wherein the residue is modified during and/or after grinding by reaction with compounds containing hydroxyl groups and/or carboxyl groups.

9. A process as claimed in claim 1, wherein the residue is modified with carbonyl compounds from the gas phase during and/or after grinding.

10. A process as claimed in claim 1, wherein the residue is modified with carbonyl compounds from the liquid phase during and/or after grinding.

11. A process as claimed in claim 5, wherein unsaturated groups are introduced into the powdered slag residue by the modification reaction.

12. A process as claimed in claim 8, wherein the powdered slag residue modified with unsaturated groups is coated in another reaction step by the radically initiated polymerization of compounds containing olefinic double bonds.

13. A process as claimed in claim 1, wherein the free isocyanate groups still present in the finely ground residue are subjected to a catalytically initiated dimerization or trimerization reaction.

* * * * *